(12) United States Patent
Kuroda

(10) Patent No.: US 6,311,011 B1
(45) Date of Patent: Oct. 30, 2001

(54) DEVICE FOR RECORDING VIDEO SIGNALS AND DEVICE FOR DISPLAYING ELECTRONIC PROGRAM GUIDE

(75) Inventor: Masahiro Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/458,696

(22) Filed: Dec. 13, 1999

(30) Foreign Application Priority Data

Dec. 11, 1998  (JP) .................................................. 10-353525

(51) Int. Cl.[7] ................................ H04N 5/91; H04N 7/00
(52) U.S. Cl. ................................................. 386/46; 386/83
(58) Field of Search ................................... 386/1, 83, 46; 360/60, 7; 348/906

(56) References Cited

U.S. PATENT DOCUMENTS

| | | | | |
|---|---|---|---|---|
| 5,124,807 | * | 6/1992 | Dulap et al. ............................. | 386/39 |
| 5,241,428 | * | 8/1993 | Goldwasser et al. ................. | 386/109 |
| 5,371,551 | * | 12/1994 | Logan et al. ........................... | 369/103 |
| 5,479,266 | * | 12/1995 | Young et al. ............................ | 386/83 |
| 5,488,409 | * | 1/1996 | Yuen et al. .............................. | 386/83 |
| 5,751,282 | | 5/1998 | Girard et al. ......................... | 345/327 |
| 5,850,218 | * | 12/1998 | LaJoie et al. ......................... | 348/906 |
| 6,118,925 | * | 9/2000 | Murata et al. ......................... | 386/83 |

FOREIGN PATENT DOCUMENTS

| | | |
|---|---|---|
| 2838892 | 12/1989 | (JP) . |
| 2-60382 | 2/1990 | (JP) . |
| 8-251496 | 9/1996 | (JP) . |
| 9-214871 | 8/1997 | (JP) . |
| 9-298697 | 11/1997 | (JP) . |
| 10-13756 | 1/1998 | (JP) . |
| 10-21601 | 1/1998 | (JP) . |
| 10-150611 | 6/1998 | (JP) . |
| 10-188390 | 7/1998 | (JP) . |
| 10-243303 | 9/1998 | (JP) . |
| 10-255393 | 9/1998 | (JP) . |
| WO-96/33579 | * 10/1996 | (WO) ............................. H04N/9/804 |

* cited by examiner

Primary Examiner—Wendy R. Garber
Assistant Examiner—Po-Lin Chieu
(74) Attorney, Agent, or Firm—Foley & Lardner

(57) ABSTRACT

A video recorder for recording signal including audio and video signals, comprises a module for receiving program information signal designating a program identifier, starting and ending time of a program, a first storage device, a first recording module for continuously recording the content signal at least one channel in the first storage device, and a module for deleting the content signals of the oldest program recorded in the first storage device in reference with the program information signals.

3 Claims, 15 Drawing Sheets

THE CURRENT STORAGE DEVICE
DOES NOT HAVE A REMAINING
CAPACITY ENOUGH TO RECORD
WHOLE CONTENTS.

· SELECT ANOTHER
  STORAGE DEVICE

· CONTINUE RECORDING
  TO THE CURRENT
  STORAGE DEVICE

FIG. 6

```
<HTML>
<BODY>
<CENTER><TABLE BORDER=10 WIDTH="100%" BGCOLOR="#FFFFFF" >
<CAPTION>SEPTEMBER 30, 1998</CAPTION>
<TR>
<TD> </TD>
<TD>
<CENTER>18</CENTER>
</TD>
<TD>
<CENTER>19</CENTER>
</TD>
<TD>
<CENTER>20</CENTER>
</TD>
</TR>
<TR>
<TD>AAA</TD>
<TD>NEWS</TD>
<TD>ANIMATION
<BR>△△△△△</TD>
<TD>SERIAL DRAMA
<BR>(35TH)</TD>
</TR>
<TR>
<TD>AAB</TD>
<TD>BASEBALL
<BR>○○○ VS ×××</TD>
<TD>BASEBALL (CONTINUATION)
<BR>○○○ VS ×××</TD>
<TD>POPULAR SONGS
<BR>COUNT DOWN 40</TD>
</TR>
<TR>
<TD>AAC</TD>
<TD>DRAMA</TD>
<TD>WEATHER FORECAST</TD>
<TD>DOCUMENTARY</TD>
</TR>
</TABLE></CENTER>
</BODY>
</HTML>
```

FIG.10

```
<HTML>
<BODY>
<CENTER><TABLE BORDER=10 WIDTH="100%" BGCOLOR="#FFFFFF" >
<CAPTION>SEPTEMBER 30, 1998</CAPTION>
<TR>
<TD> </TD>
<TD>
<CENTER>18</CENTER>
</TD>
<TD>
<CENTER>19</CENTER>
</TD>
<TD>
<CENTER>20</CENTER>
</TD>
</TR>
<TR>
<TD>AAA</TD>
<TD>NEWS</TD>
<TD BGCOLOR="#33CCFF">ANIMATION
<BR>△△△△△</TD>
<TD>SERIAL DRAMA
<BR>(35TH)</TD>
</TR>
<TR>
<TD>AAB</TD>
<TD>BASEBALL
<BR>○○○ VS ×××</TD>
<TD>BASEBALL (CONTINUATION)
<BR>○○○ VS ×××</TD>
<TD>POPULAR SONGS
<BR>COUNT DOWN 40</TD>
</TR>
<TR>
<TD>AAC</TD>
<TD>DRAMA</TD>
<TD>WEATHER FORECAST</TD>
<TD>DOCUMENTARY</TD>
</TR>
</TABLE></CENTER>
</BODY>
</HTML>
```

|     | 18 | 19 | 20 |
|-----|----|----|----|
| AAA | NEWS | ANIMATION △△△△△ | SERIAL DRAMA 35TH |
| AAB | BASEBALL ○○○ VS ×××  | BASEBALL (CONTINUATION) ○○○ VS ××× | POPULAR SONGS COUNTDOWN 40 |
| AAC | DRAMA | WEATHER FORECAST | DOCUMENTARY |

|     | 18 | 19 | 20 |
|-----|----|----|----|
| AAA | NEWS | ANIMATION △△△△△ | SERIAL DRAMA 35TH |
| AAB | BASEBALL ○○○ VS ××× | BASEBALL (CONTINUATION) ○○○ VS ××× | POPULAR SONGS COUNTDOWN 40 |
| AAC | DRAMA | WEATHER FORECAST | DOCUMENTARY |

FIG. 13

SEPTEMBER 30, 1998      1301 CURRENT TIME LINE

| TIME / CHANNEL | 18 | 19 | 20 |
|---|---|---|---|
| AAA | NEWS | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 14

| TIME / CHANNEL | 18 | 19 | 20 |
|---|---|---|---|
| AAA | NEWS [RECORD] | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 15

| TIME / CHANNEL | 18 | 19 | 20 |
|---|---|---|---|
| AAA | NEWS | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 16

| TIME CHANNEL | 18 | 19 | 20 | |
|---|---|---|---|---|
| AAA | NEWS | ANIMATION △△△△△ | SERIAL DRAMA 35TH | RESERVED |
| AAB | BASEBALL ○○○ VS ××× | | POPULAR SONGS COUNTDOWN 40 | |
| AAC | DRAMA | WEATHER FORECAST | DOCUMENTARY | |

FIG. 17

| TIME CHANNEL | 18 | 19 | 20 |
|---|---|---|---|
| AAA | NEWS | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 18

| TIME CHANNEL | 18 | 19 | 20 |
|---|---|---|---|
| | IMAGE | PROGRAM DIGEST | |
| AAA | NEWS | ANIMATION △△△△△ | SERIAL DRAMA 35TH |
| AAB | BASEBALL ○○○ VS ×××  | SELECTED | POPULAR SONGS COUNTDOWN 40 |
| AAC | DRAMA | WEATHER FORECAST | DOCUMENTARY |

FIG. 19

| TIME CHANNEL | 18 | 19 | 20 |
|---|---|---|---|
| AAA | NEWS | ANIMATION △△△△△ | SERIAL DRAMA 35TH |
| AAB | BASEBALL ○○○ VS ××× (selected) | | POPULAR SONGS COUNTDOWN 40 |
| AAC | DRAMA | WEATHER FORECAST | DOCUMENTARY |

FIG. 20

| TIME<br>CHANNEL | 18 | 19 | 20 |
|---|---|---|---|
| AAA | NEWS | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 21

| IMAGE | PROGRAM DIGEST | |
|---|---|---|
| TIME / CHANNEL | ch1 NOW RECORDING 00:10<br>SELECT A STORAGE DEVICE<br>HDD 3.25<br>DVD NO DISK<br>VCR WRITE INHIBIT | 20 |
| AAA NEWS | | SERIAL DRAMA 35TH |
| AAB BASEB ○○○ | | POPULAR SONGS COUNTDOWN 40 |
| AAC DRAMA | WEATHER FORECAST | DOCUMENTARY |

FIG. 22

| CHANNEL \ TIME | 18 | 19 | 20 |
|---|---|---|---|
| AAA | NEWS | ANIMATION △△△△△ | SERIAL DRAMA 35TH |
| AAB | BASEBALL ○○○ VS ××× | SELECTED | POPULAR SONGS COUNTDOWN 40 |
| AAC | DRAMA | WEATHER FORECAST | DOCUMENTARY |

(Above: IMAGE | PROGRAM DIGEST)

FIG. 23

| CHANNEL \ TIME | 18 | 19 | 20 |
|---|---|---|---|
| AAA | NEWS | ANIMATION △△△△△ | SERIAL DRAMA 35TH |
| AAB | BASEBALL ○○○ VS ××× | | POPULAR SONGS COUNTDOWN 40 |
| AAC | DRAMA | WEATHER FORECAST | DOCUMENTARY |

FIG. 24

DEVICE FOR RECORDING VIDEO SIGNALS AND DEVICE FOR DISPLAYING ELECTRONIC PROGRAM GUIDE

BACKGROUND OF THE INVENTION

This invention relates to a device for recording and playing data streams of audio, video and related information. This invention also relates to a device for displaying Electronic Program Guide (EPG).

Recently, in order to cope with enormous amounts of contents in digital broadcasting age coming in the near future, it is promoted that image compression technique and capacity enlargement technique for recording media, such as optical disk, magnetic disk and so on are strongly developed.

Generally, a video data stream encoded and compressed by MPEG 2 is transmitted at 6 Mbps data rate with SDTV quality or 22 Mbps data rate with HDTV quality per content. Compared with non-compressed contents, MPEG 2 can substantially decrease an amount of video data streams. The beginning of digital broadcasting causes an increase of contents to occur on one hand. On the other hand, unit costs of recording media have been remarkably reduced recently.

However, it is practically impossible at the present that viewers record all of broadcast programs and watch favorite one of the programs at any time the viewers request.

In the U.S.A. and Europe, digital broadcasting has been already provided. In Japan, CS (Communication Satellite) has provided digital broadcasting already, and terrestrial broadcasting and BS (Broadcasting Satellite) is ready for digital broadcasting. Digital broadcasting brings about enormous amounts of contents and, as a result, forcibly makes viewers select programs that they really want to watch from the enormous amounts of the contents.

Actually, a conventional video recorder/player comprises a recording medium which is too small in memory capacity to record all of contents broadcast. However it is useful to record only latest programs that belong to such as news program, weather forecast program and so on.

Further, there is no conventional video recorder/player such as that comprises a plurality of recording media including a random access device and manages all of the recording media under unified user interface such as management of copying among the media. When we record video signals by the conventional video recorder/player, we have to operate respective media. EPG has been adopted in order to assist a viewer to select a favorite program from enormous programs. However, EPG is to display information about programs that are being broadcast currently or will be broadcast in the future. Namely, a conventional EPG is not used to display information about past contents. Furthermore, typical conventional EPG as shown in FIG. 1 is hardly useful for a viewer to select a program.

The following information is provided to disclose pertinent information that is relevant to the subject of the present invention. The documents, which are believed to be pertinent to the present invention, are "An EPG device and a method for EPG management" (Japanese Pat. public No. H10-150611), "Television receiver" (Japanese Pat. public No. H10-13756), "A device for recording and playing information" (Japanese Pat. public No. H10-255393), "A device for displaying and managing electronics program guide" (Japanese Pat. public No. H9-298697), "A display controller" (Japanese Pat. public No. H8-251496) and "System and method for calling video on demand using an electronic programming guide" (U.S. Pat. No. 5,751,282).

It is an object of the present invention to provide a video recorder/player that records contents for a predetermined time, or predetermined number of programs, of at least one channel without Viewer's intention. This video recorder/player constantly records definite amount of latest contents. Consequently, the viewer can always watch a current broadcast program from the beginning even if the viewer starts to watch in the middle of the program time. The video recorder/player doesn't have to record all of contents so that required amount of its recording medium capacity is riot so large.

It is another object of the invention to provide a video recorder/player that starts to record contents simultaneously with viewer's conscious operation for recording contents without delay.

It is still another object of the invention to provide a video recorder/player that displays EPG for listing not only current and future program information but also past program information and offers unified interface to the viewer in reference with the EPG, the viewer can tune into current programs or reserve to record future programs and moreover can operate the video recorder/player for playing back past programs in a manner like the current and the future programs.

According to this invention, a video recorder for recording content signals including audio and video signals, comprises a module for receiving program information signals designating a program identifier, starting and ending time of a program, a first storage device, a first recording module for continuously recording the content signals at least one channel in the first storage device, and a module for deleting the content signals of the oldest program recorded in the first storage device in reference with the program information signals.

The video recorder may further comprise a second storage device and a second recording module for recording content signals in the second storage device according to a direction given from outside of the video recorder in order to record contents.

The second recording module may comprise a direct recording module for recording current content signals which are currently received by the video recorder in the second storage device without recording in the first storage device, an indirect recording module for copying content signals that have been recorded in the first storage device into the second storage device, and a module for merging content signals recorded by both the direct recording module and the indirect recording module.

The second recording module may copy content signals in order of the data stream of the content signals from the first storage device to the second storage device. In this case, the second recording module may be operable in parallel with the first recording module. The second recording module may be operated after operation of the first recording module.

The video recorder may further comprise a third storage device for storing the program information data signals, and an EPG creating module for creating EPG signals that designate electronic program guide (EPG) listing program titles and viewing times of past, current and future programs. In this case, the video recorder may further comprise reservation management module for managing reservation to be going to record a future program, wherein the EPG creating module creates the EPG, signals which denote that one program reserved by the reservation management module is distinct from the other programs. The video recorder may further comprise a module for composing video signals from content signals and the EPG signals. The EPG creating module may create the EPG signals that denote that one program recorded in the first storage device is distinct from the other programs. The video recorder may further comprise interface for connecting with at least one external storage device, and a module for managing the storage device(s) as the first, second, and/or third storage device(s).

The first storage device may belong to random access storage device. The second storage device may belong to sequential access storage device.

BRIEF DESCRIPTION OF THE DRAWING

FIG. 6 shows an example dialogue screen illustration of the video recorder/player.

FIG. 10 shows a HTML source file designating an EPG screen.

FIG. 11 shows a HTML source file designating an EPG screen.

FIG. 12 shows an EPG screen according to the HTML file of FIG. 10.

FIG. 13 shows an EPG screen according to the HTML file of FIG. 11.

FIG. 14 shows an example EPG screen.

FIG. 15 shows an example EPG screen.

FIG. 16 shows an example EPG screen.

FIG. 17 shows an example EPG screen.

FIG. 18 shows an example EPG screen.

FIG. 19 shows an example EPG screen.

FIG. 20 shows an example EPG screen.

FIG. 21 shows an example EPG screen

FIG. 22 shows an example EPG screen.

FIG. 23 shows an example EPG screen.

FIG. 24 shows an example EPG screen.

DESCRIPTION OF THE PREFERRED EMBODIMENTS

Description will be made about embodiments of the present invention in the following order:

(1) Construction of a video recorder/player;
(2) First working process of the video recorder/player:
(3) Second working process of the video recorder/player;
(4) Third working process of the video recorder/player;
(5) Construction of an EPG displaying device;
(6) Working process of the EPG displaying device;
(7) Process for displaying EPG;
(8) Operation of the EPG displaying device through EPG;
(9) Time-shift recording 1; and
(10) Time-shift recording 2.

(1) Construction of a Video Recorder/Player

Figure 1:
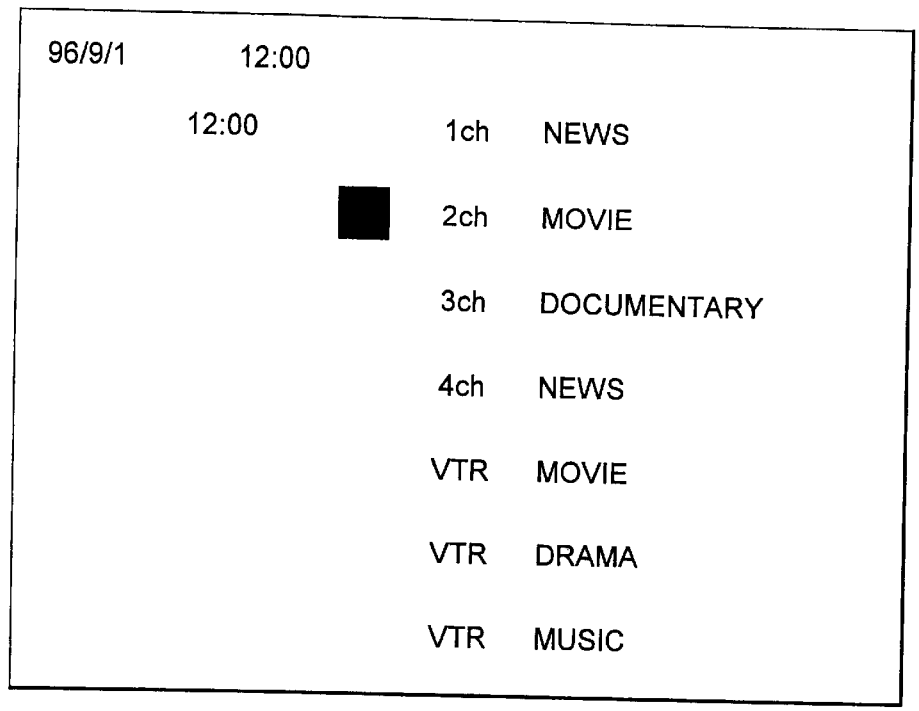
FIG. 1 shows an example screen illustration of a conventional EPG.
Figure 2:
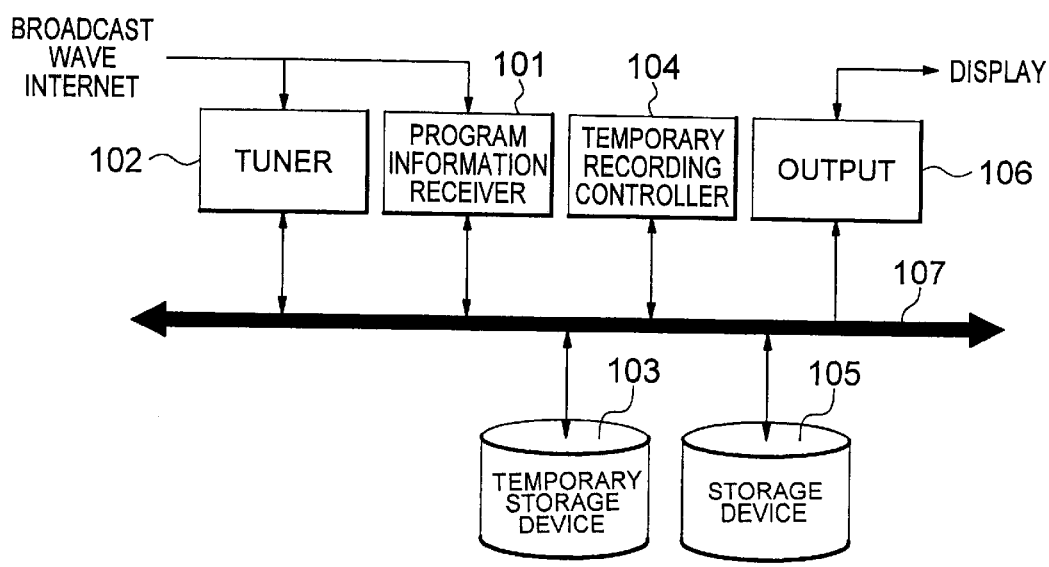
FIG. 2 shows a video recorder/player according to this invention.

With reference to FIG. 2, a video recorder/player, which is a first embodiment of the present invention, comprises a program information receiver 101, a tuner 102, a temporary storage device 103, a temporary recording controller 104, a storage device 105, an output module 106, and a data bus 107.

The program information receiver 101 receives program information that is related to each program from broadcasting media. The program information comprises opening and ending time of programs, bit rates, preview of the program and so on. The broadcasting media comprise broadcast wave, cable television network, Internet and so on.

The tuner 102 comprises a plurality of tuning modules each of which selects a specific channel from broadcast wave. One of the tuning modules selects a channel for recording a program currently directed or past reserved by a viewer and the other one selects a channel directed by a viewer in order to record all programs of the channel for predetermined time to the temporary storage device 103.

The temporary storage device 103 temporarily stores content signals. Especially a random access storage device like a hard disk is suitable for the temporary storage device 103. The temporary recording controller 104 controls the time for the temporary storage device 103 to store content signals. Namely, The temporary recording controller 104 compares present time with program information recorded to the temporary storage device 103. When the amount of programs recorded to the temporary storage device 103 overflows in comparison with time or number of programs predetermined by the viewer (or default time or number of programs), the temporary recording controller 104 deletes the oldest contents from the temporary storage device 103.

The storage device 105 stores content signals according to a viewer's direction. The storage device 105 may comprise a plurality of storage device with a removable medium such as video cassette recorder (VCR), digital video disk (DVD). The storage device 105 may be built-in the video recorder/player or be connected with the video recorder/player as a peripheral device. When the viewer gives the video recorder/player an intentional direction to record a television program, the program is recorded in the storage device 105. A program recorded In the storage device 105 is held until another intentional direction to delete the program is given by the viewer. Therefore, a storage device storing a removable medium is suitable for the storage device 105. However, A program recorded to the temporary storage device 103 is automatically deleted after a while if an intentional direction to save the program is not given.

The output module 106 receives content signals from the tuner 102, the temporary storage device 103 and the storage device 105 and outputs audio, video and EPG signals to monitor.

The data bus 107 transmits content signals, program information signals and so on.

The video recorder/player works in the following manner as a general rule. A viewer designates at least one channel and contents quantity to be recorded. The contents quantity is designated by time of contents or number of programs. The video recorder/player constantly records the designated contents quantity of the designated channels.

Actually, the tuner 102 and the program information receiver 101 constantly receive contents and program information signals. The temporary storage device 103 constantly stores content signals. The temporary recording controller 104 refers program information and the content signals recorded to the temporary storage device 103 and deletes the oldest content signals from the temporary storage device 103 when the contents quantity recorded to the temporary storage device 103 exceeds the contents quantity.

(2) First Working Process of the Video Recorder/Player

Figure 3:
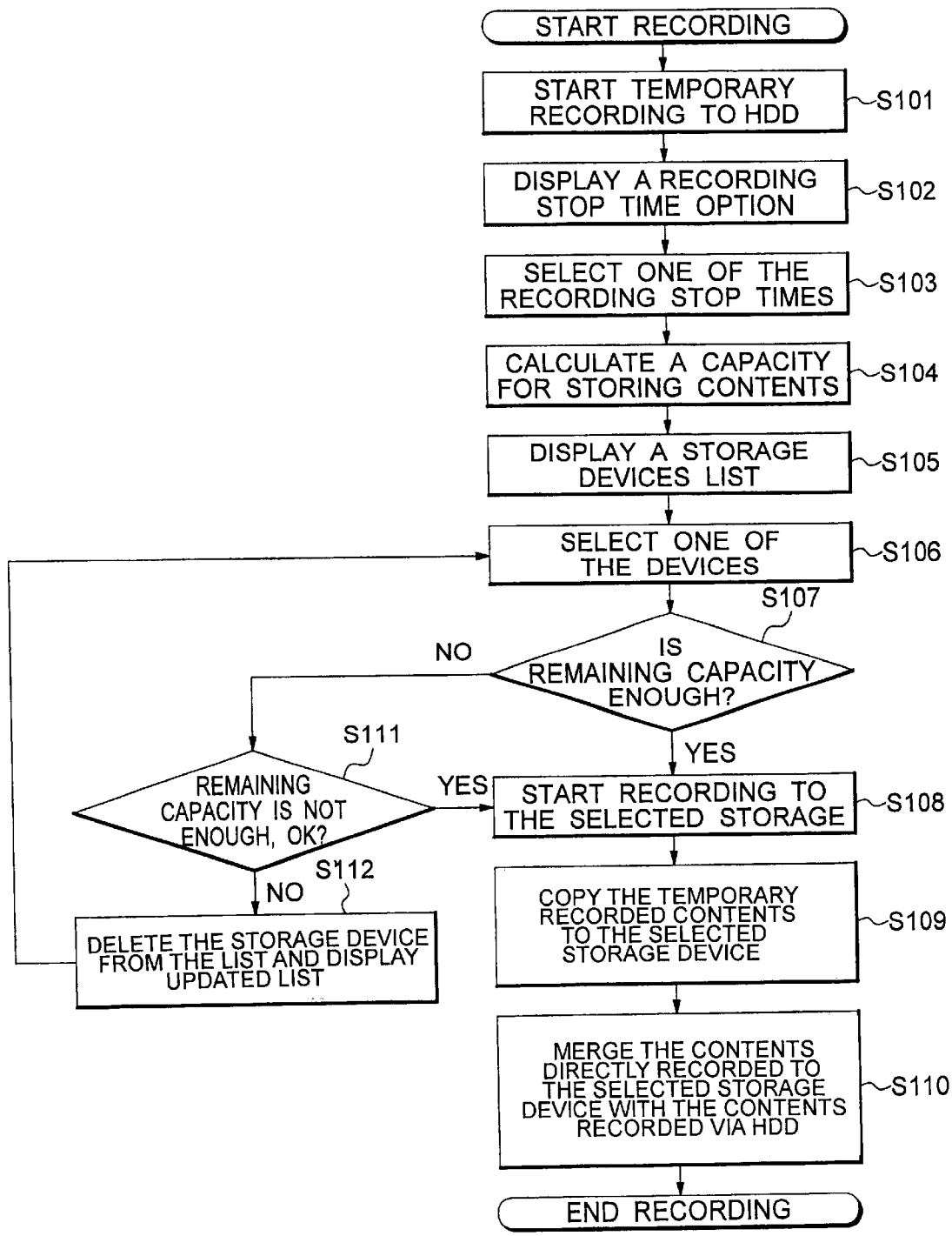
FIG. 3 shows a flow diagram of a preferred method for operating the video recorder/player.

In reference with FIG. 3, description will be made about a recording action of the above-mentioned video recorder/player.

When a viewer give the video recorder/player a direction to record a current program, the video recorder/player records the content signals of the program to the temporary storage device 103 such as a hard disk drive device (STEP S101).

Figure 4:
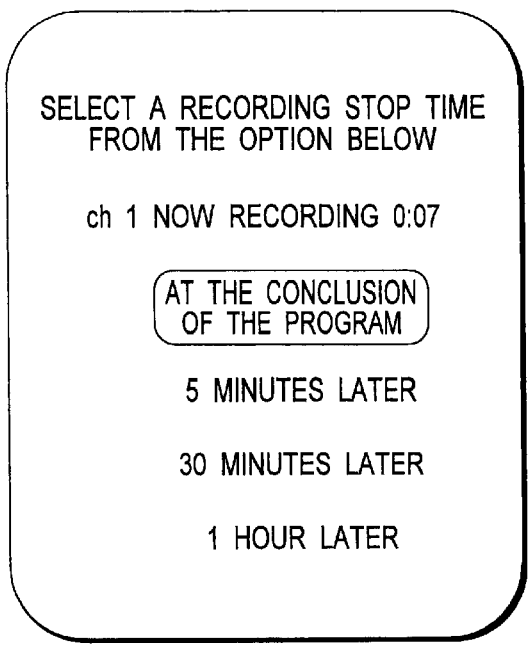
FIG. 4 shows an example dialogue screen illustration of the video recorder/player.

Next, the video recorder/player displays a dialogue screen like FIG. 4 for noticing a channel number, passage of time, and optional finish times to record (STEP S102).

A viewer selects a finish time by cursor (STEP S103). In FIG. 4, the cursor selects "at the ending of the program". The video recorder/player calculates necessary capacity size of recording medium for the selected quantity of contents at STEP S103 and bit rate of the broadcasting content (STEP S104).

Figure 5:
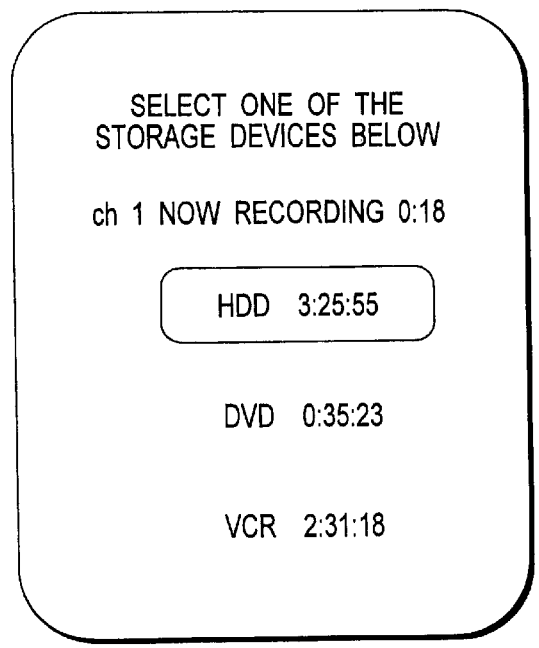
FIG. 5 shows an example dialogue screen illustration of the video recorder/player.

The video recorder/player displays a dialogue screen like FIG. 5 for listing storage devices which belong to the storage device 105 (STEP S105). In the dialogue screen of FIG. 5, a channel number (ch1), passage time from starting recording (0:18) and list of storage devices (HDD, DVD and VCR) and these remaining capacities are displayed. The viewer selects one of storage devices in the dialogue screen like FIG. 5 (STEP S106).

The video recorder/player compares the calculated capacity at STEP S104 with the remaining capacity of the storage device selected at STEP S106 (STEP S107). If the remaining capacity is larger than the calculated one, then STEP S108 follows, or else STEP S111 follows.

The video recorder/player starts to record content signals in the storage device designated at STEP 106 and records the starting time (STEP S108).

The video recorder/player moves the content signals recorded to the temporary storage device 103 to the designated storage device belonging to the storage device 105 at STEP S106 (STEP S109). The content signals is moved to one of the storage device 105 while storage data bus is not busy because degree of congestion to reserve recording is low. Higher priority may be given to move from the temporary storage device 103 into the storage device 105 if the viewer requests. The movement may be suspended while unexpected load is given to data bus because the video recorder/player executes trick play or the like.

The video recorder/player finishes recording late part of the content signals in the storage device 105 and moving early part of the content signals from the temporary storage device 103 into the storage device 105. Finally, the video recorder/player merges both parts of the content signals and records whole of the content signals as one file (STEP S110) and the first working process is end.

If the remaining capacity Is insufficient at STEP S107, STEP S111 is executed. A dialogue of FIG. 6 warns that the storage device selected at STEP S106 does not nave sufficient capacity for recording the contents and allows the viewer a choice to select another storage device or to record the storage device at STEP S106 (STEP S111). If another storage device is selected, then STEP S112 follows STEP S111, or else STEP S108 follows STEP S111.

At STEP S112, the video recorder/player displays the dialogue of FIG. 5 without the storage device selected last time. Further STEP S106 is executed again to allow the viewer to select another storage device.

(3) Second Working Process of the Video Recorder/Player

Figure 7:
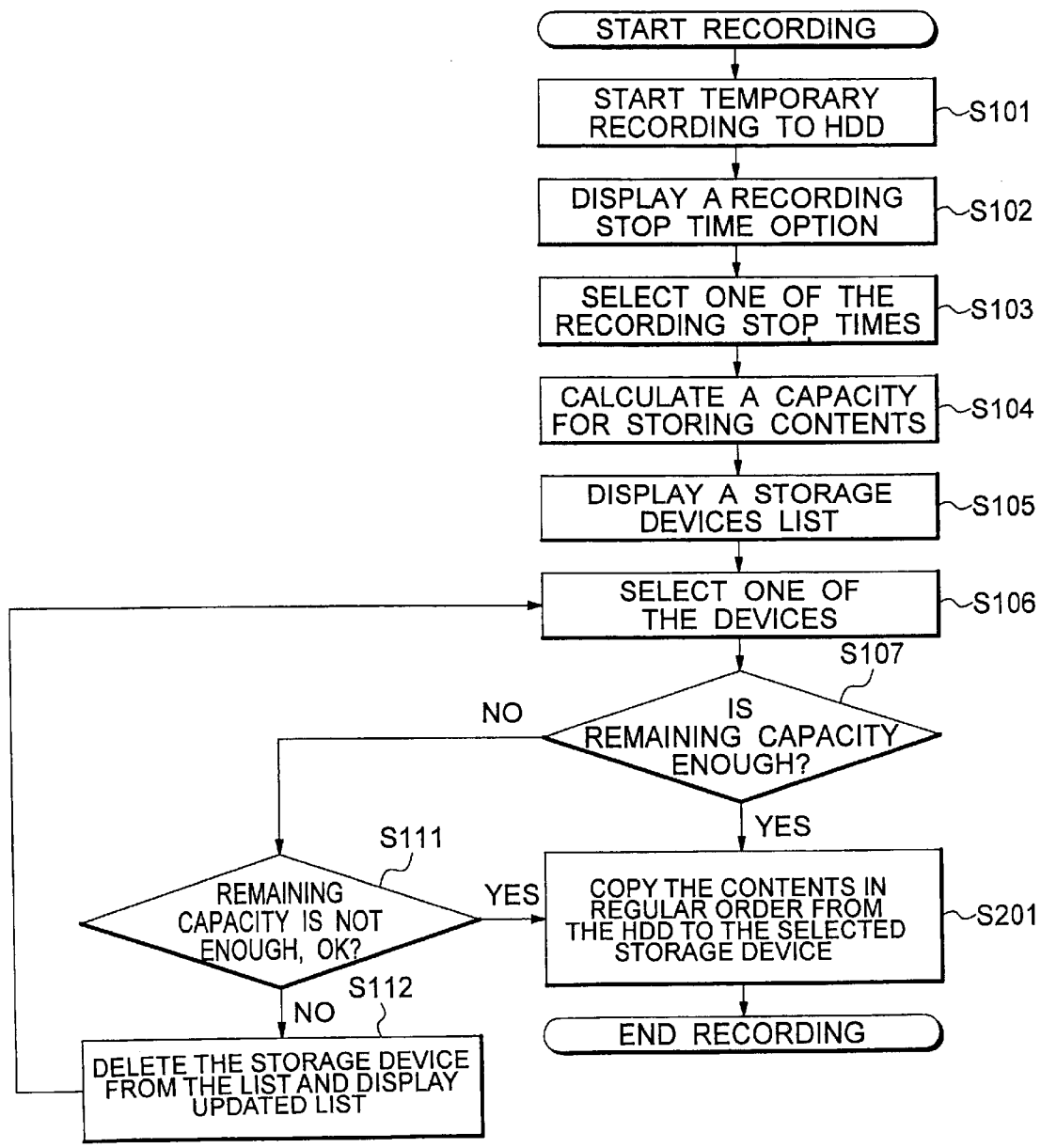
FIG. 7 shows a flow diagram of a preferred method for operating the video recorder/player.

In reference with FIG. 7, second working process of the video recorder/player will be described below. As shown in FIGS. 3 and 7, STEP S101 to S107, S111 and S112 in FIG. 7 are the same steps in FIG. 3 so that description about the same steps should be referred to the above-mentioned description.

According to the first working process, a latter part of content signals are directly recorded in the storage device 103. However, according to the second working process, the video recorder/player records all of content signals in the storage device 105 via the temporary storage device 103. Namely, the video recorder/player copies content signals from the temporary storage device 103 into the storage device 105 in order of signal arrival at the tuner 102 (STEP S201). When content signals are copied into the storage device 105 the video recorder/player deletes the signals from the temporary storage device 103. This copying process is parallel with recording from broadcasting media to the temporary storage device 103.

(4) Third Working Process of the Video Recorder/Player

Figure 8:
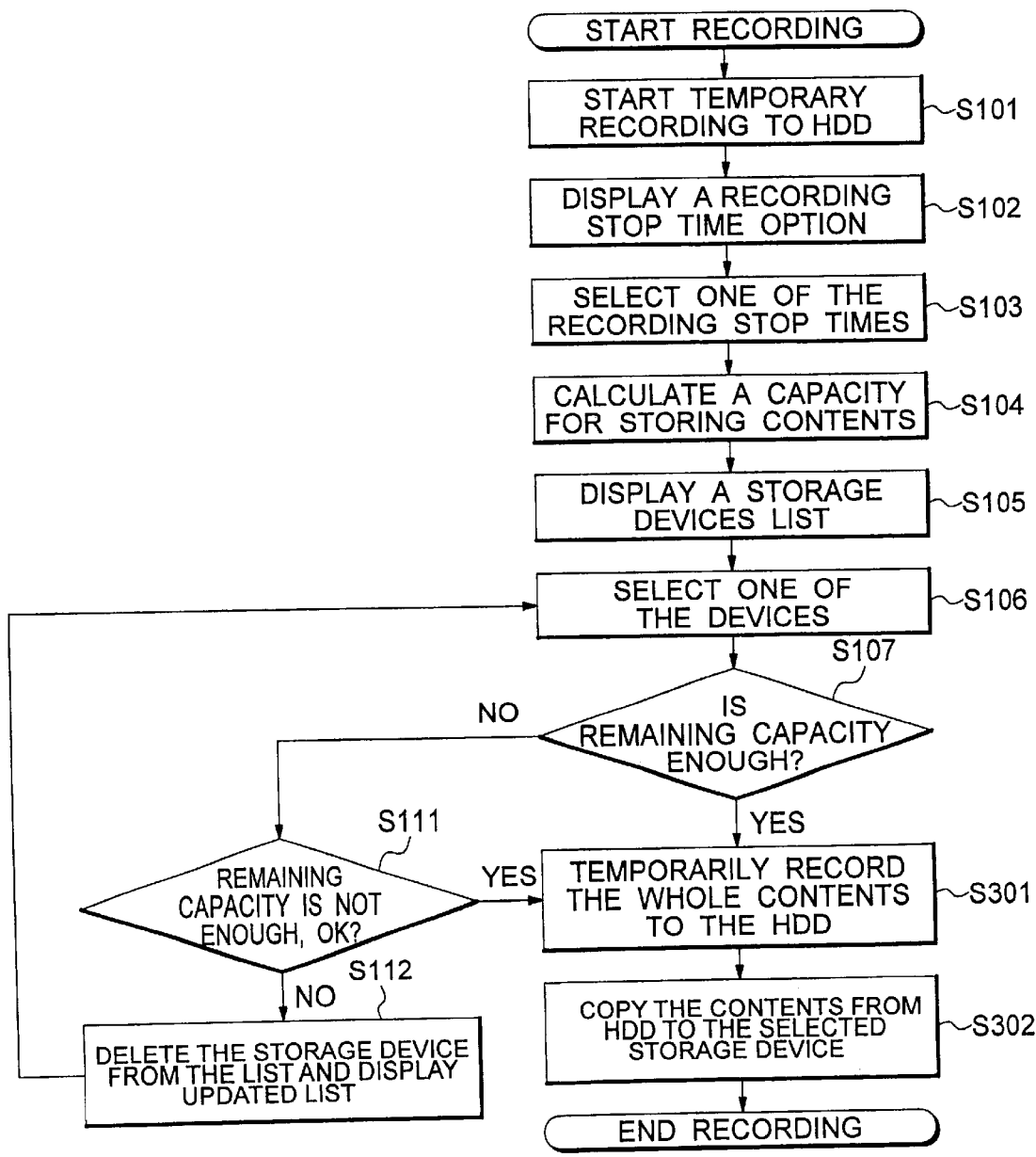
FIG. 8 shows a flow diagram of a preferred method for operating the video recorder/player.

Next, the third working process will be described below in reference with FIG. 8. The same as the second working process, STEP S101 to S107, S111 and S112 in FIG. 8 are the same steps in FIG. 3 so that description about the same steps should be referred to the above-mentioned description.

The same as the second working process, the video recorder/player records all of content signals in the storage device 105 via the temporary storage device 103 according to the third working process. However, copying from the temporary storage device 103 into the storage device 105 is not parallel with recording from broadcasting media to the temporary storage device 103. In the third working process, firstly, all of content signals are recorded to the temporary storage device 103. After completion of recording all of content signals to the temporary storage device 103, the content signals are copied into the storage device 105.

Whichever is selected for the storage device to record content signals at STEP S106, the video recorder/player continuously records content signals to the temporary storage device 103 (STEP S301).

After the video recorder/player has finished recording to the temporary storage device 103 at STEP S301, the video recorder/player moves the content signals from the temporary storage device 103 into the storage device selected at STEP S107 (STEP S302). The content signals recorded to the temporary storage device 103 may be deleted after completion of or in parallel with copying the content signals to the selected storage device.

(5) Construction of an EPG Displaying Device

In reference with FIG. 9, another embodiment of the present invention will be explained below. This embodiment is an electronic program guide (EPG) displaying device that is supplied broadcast wave to a tuner 801 via an antenna or the like. The broadcast wave comprises content signals and program information signals. The program information signals comprise a program ID, scheduled viewing time of a program et al. for creating EPG signals. Any type of broadcast services such as satellite broadcast, terrestrial broadcast and cable television service are available for sending the broadcast wave. The broadcast wave may be sent by either analog or digital broadcasting.

The tuner 801 selects at least one channel designated by a program recording processor 802 or an EPG input/output 803 and sends data signals to a signal separator 804. These data signals comprise content signals such as audio and video signals, and program information signals for creating EPG such as program IDs, scheduled viewing time of programs and so on. For example, the program information signals may be inserted in 10H to 19H and/or 262H to 271H in video signals or vertical synchronizing signals of broadcast wave. The signal separator 804 separates content signals and program information signals from the data signals sent by the tuner 801.

A program information decoder 805 decodes the program information signals and sends them to an EPG manager 806. The EPG manager 806 integrates a stored program information manager 807 and a reserved program Information manager 808, and manages them. The stored program information manager 807 manages the program information of the programs that have been recorded to the EPG displaying device. The reserved program information manager 808 manages the program information of the programs that have been reserved to be recorded. The EPG manager 806 receives stored and reserved program information from the manager 807 and 808 in order to create EPG signals.

The EPG input/output 803 outputs signals for displaying EPG according to the EPG signals created by the EPG manager 806. Further, according to viewer's operations via a remote control Input 809, the EPG input/output 803 moves a cursor or a pointer on a screen displayed EPG and makes the tuner 801 tune to the channel selected by the cursor/pointer. Consequently, the viewer can tune to his/her favorite channel by moving a cursor/pointer on screen with a remote controller The reserved recording processor 802 executes reservation of recording a program according to manual or automatic operation. The reserved recording processor 802 receives program information from the EPG manager 806 as the need arises. When recording a program is reserved the reserved recording processor 802 records its program information to a reserved program information recorder 810. A manual reserving operation is executed according to input signals from the remote controller. An automatic reserving operation will be described later.

According to inputting signals from the remote controller for playing a program, a playing processor 811 plays the program. Namely, the playing processor 811 retrieves a corresponding program information by the stored program information manager 807, and transmits content signals of the program information to an audio decoder 813 and a video decoder 814.

A program information recorder 815 receives program information signals from the EPG manager 806 and records them.

The stored program information manager 807 manages program information of the program that has been recorded and may manage information about playing, such as current playing position in a program. Program information comprises program $IDs_1$ starting and ending times of programs and so on.

The reserved program information manager 808 manages the program information of the programs designated by the manual or automatic reserving operation and provides the program information to the EPG manager 806. The reserved program information recorder 810 receives program information from the reserved program information manager 806 and stores the program information.

The contents recorder 812 stores content signals (audio and video signals) of recorded programs. For example, a magnetic disk storage device, a magneto-optical disk storage device, a magnetic tape storage device are applicable for the contents recorder 812. The storage device which works as the contents recorder 812 may be built In the EPG displaying device, or connected with the EPG displaying device as an external device.

A video composer 817 composes video signals that received from broadcast wave or have been stored to the contents recorder 812 and EPG signals created by the EPG input/output 803 into one screen image. And then, the video composer 817 sends the screen image to a video output 818.

The remote control input 809 receives signals from a remote controller and identify instruction code of the signals.

The playing processor 811 plays content signals according to the instruction code for playing the content signals from the remote control input 809.

The audio decoder 813 and the video decoder 814 receive audio and video signals from the contents recorder 812 and decode the signals that are encoded and, compressed by MPEG or the like.

The video output 818 displays Images according to signals output from the video composer 817. The audio output 819 sounds according to signals output from the audio decoder 813.

A recording/playing controller 820 controls external storage devices 821, 822 and 823 in order to record/play content signals stored in the external storage devices 821, 822 and 823. Although the recording/playing controller 820 is connected with three storage devices in FIG. 9, More storage devices may be connected with the recording/playing controller 820.

(6) Working Process of the EPG Displaying Device

A working process of the EPG displaying device mentioned above will be described below. In this working process, broadcast wave is sent by digital satellite broadcast system and conveys data signals encoded/compressed by MPEG.

The tuner 801 receives the broadcast wave, demultiplexes transport stream comprising the program desired by a viewer, and sends the transport stream to the signal separator 804.

The signal separator 804 separates packets of the desired program from the transport stream. Now, it is assumed that the desired program is broadcast through CHANNEL A. When the viewer instructs the EPG displaying device to display the program, the signal separator 804 sends content signals (audio and video signals) of CHANNEL A to a MPEG decoder (the audio decoder 813 and the video decoder 814). When the viewer instructs the EPG displaying device to record the program, the signal separator 804 sends the content signals to the contents recorder 812 in order to store the content signals. For example, a hard disk, a writable optical disk and magnetic tape are available for the contents recorder 812.

Furthermore, the signal separator 804 separates packets of program information corresponding to the desired program from the transport stream and sends the packets to the program information decoder 805. Program information comprises a plurality of items such as a program ID for recognizing the program, starting and ending time of the program, and preview of the program. EPG consists of these items. The program information decoder 805 classifies program information in these items and sends them to the program information recorder 815. The program information recorder 815 stores the items and may comprise nonvolatile storage devices (HDD, flash memory) or volatile storage devices(RAM).

The EPG manager 806 collectively manages the items of the program information corresponding to current, stored and reserved programs. In order to record a current program or reserve to record a future program, the EPG manager sends corresponding items to the stored program information manager 807 or the reserved program information manager 808. In case of recording a current program, the stored information manager 807 sends the items to the stored program information recorder 816. In case of reserving a future program, the reserved program information manager, 808 sends the items to the reserved program information recorder 810. Such nonvolatile storage devices as HDD and flash memory are available for the stored program information recorder 816 and the reserved program information recorder 810.

When the viewer sends an instruction for displaying EPG to the EPG displaying device with the remote controller, the EPG manager 806 receives the instruction through the remote control input 809 and the EPG input/output 803. The EPG manager 806 retrieves program information of the date and time designated in the instruction from the program information recorder 815, the stored program information recorder 816 and the reserved program information recorder 810. From the program information, the EPG manager 806 constructs EPG data according to predetermined format and sends the EPG data back to the EPG input/output 803. For example, it may be available for the EPG format to list items of the program information as texts, and to designate screen layout according to MHEG (multimedia and hypermedia information coding expert group) or HTML (hypertext markup language).

The EPG input/output 803 outputs video signals for designating the EPG data according to the predetermined EPG format to the video composer 817. To output such video signals, the EPG input/output 803 may have a function as a MHEG decoder, a HTML browser or the like.

The video composer 817 receives EPG data output from the EPG input/output 803 and video data decoded by the video decoder 814, and executes on-screen display (OSD) process for composing the video and EPG data. The composed data are sent to the video output 818 and displayed for the viewer.

Next, detailed description will be made about working processes of the program information decoder 805 and the EPG manager 806.

Figure 9:
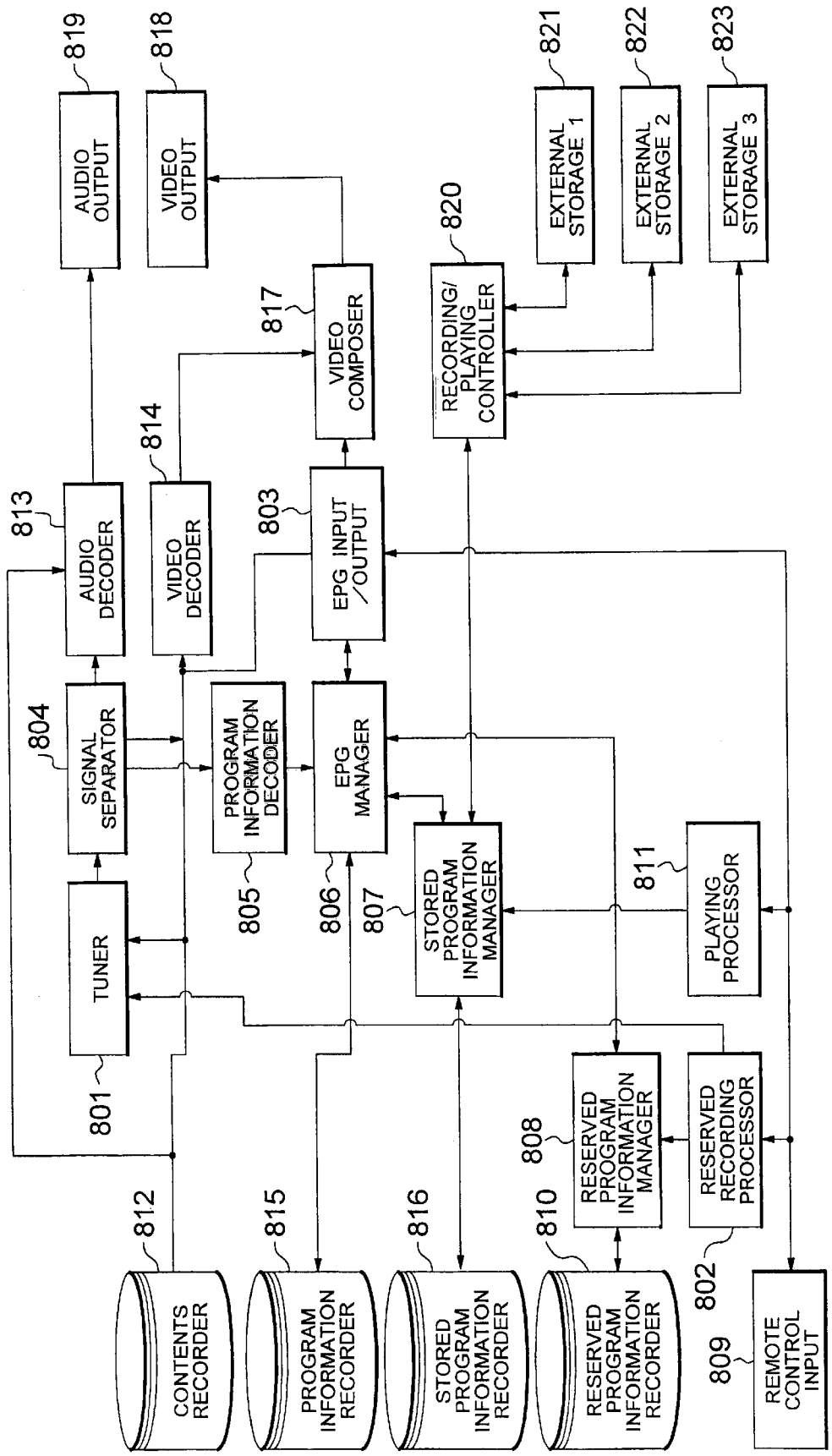
FIG. 9 shows an EPG displaying device according to this Invention.

In case of that the EPG format is designated according to HTML, a part of program information separated from the transport stream is shown as FIG. 9, The program information decoder 805 picks out such items as a program ID, a channel number, starting and ending time of a program of each of programs from the program information. The items corresponding to current and future programs are stored to the program information recorder 81 as a database. The items corresponding to recorded programs are stored to the stored program information recorder 816 and the items corresponding to reserved programs, which the EPG displaying device is programmed to store, are stored to the reserved program information recorder 810 as a database.

In case of that the EPG format Is listing text information, designated according to MHEG or the like, similarly, the program information decoder 805 picks out the Items and sends them to appropriate recorder to store them as a database.

When the viewer directs the EPG displaying device to display EPG, the EPG manager 806 receives an instruction for displaying EPG via the EPG input/output 803. Next, the EPG manager 806 retrieves program information corresponding to the date and time designated in the instruction from the recorders 810, 815 and 816 in order to create EPG data according to HTML.

Furthermore, the EPG manager 806 creates the EPG data in which backgrounds of recorded programs and reserved programs are distinctly displayed from the other programs. For example when the EPG displaying device receives the program information as a HTML file shown in FIG. 10, and is instructed to reserve recording a program "ANIMATION ΔΔΔΔΔ" on a channel AAA from 19:00, the EPG manager 806 reconstructs from the HTML file to the one shown in FIG. 11 and outputs to the EPG input/output 803. The HTML files shown in FIG. 10 and 11 are displayed as shown in FIGS. 12 and 13.

According to the EPG displaying device mentioned above, the EPG manager 806 adds information about reserved and recorded programs to EPG signals and outputs transformed EPG signals according to predetermined EPG format. Consequently even if a device like a conventional television, which outputs EPG signals without any additional information, is connected with the EPG displaying device, the EPG displaying device can add information about reserved and recorded programs to EPG signals received from broadcast media.

(7) Process for Displaying EPG

Next, description will be made about EPG screen output by the EPG displaying device. The EPG displaying device sorts out program information from broadcast wave to create EPG signals for designating a table of channel numbers and scheduled viewing times of programs in a few days. A part of the created EPG signals is displayed as shown in FIG. 14. Either channel numbers or time is available for a vertical line of the EPG. A broken line in FIG. 14 named current time line 1301 is drawn in order to enable a viewer to easily identify current programs in the EPG. Moreover, a mark is put on the screen area of a recorded program in the EPG according to stored program information as shown in FIG. 15. In a screen area of a news program (channel AAA, 18:00 to 19:00), letters of "record" are displayed. Instead of marking letters, background of a recorded reserved may be distinct from the other programs as shown in FIG. 16. Similarly to these indications of recorded programs, another mark of letters reserved may indicate a reserved program in the EPG as shown, in FIG. 17, or background of a reserved program area in the EPG may be distinctly colored as shown in FIG. 18.

The EPG manager 806 converts stored and reserved program information signals into the same format as the format of program information signals that are sorted from broadcast wave, and Creates EPG signals designating an EPG table. In order to display the EPG table, the EPG input/output 803 decodes EPG signals and outputs the decoded EPG signals to the video output 818 like a television. If the file format of the EPG is MHEG format, then the EPG input/output 803 includes a function as a MHEG decoder. If the file format of the EPG is HTML, then the EPG input/output 803 includes a function as a HTML browser.

(8) Operation of the EPG Displaying Device Through EPG

Next, description will be made about an operation for selecting a program through EPG. According to the viewer's operation sent from the remote controller, the EPG input/output 803 receives signals from the program information recorder 815, the stored program information recorder 816 and the reserved program information recorder 810 and composes EPG signals from the signals. The EPG signals is sent to the video output 818 via the video composer 817 and displayed on a screen with an image of a current program and a digest of another program as shown in FIG. 19.

In the EPG screen, a current program of the channel selected by the viewer is marked up with letters "selected" as shown in FIG. 19, or painted its background in a different color from the other programs as shown in FIG, 20 in order to become distinct from the other programs. The remote controller comprises channel-selecting keys for shifting channel number, numeral keys, each of which corresponds to a specific channel, cursor keys for moving a cursor in the screen and so on. When the viewer operates these keys of the remote controller, the cursor in the EPG screen moves and the tuner 801 selects the channel corresponding to the cursor position. The former selected program is displayed normally and the current selected program is marked up or painted its background Description will be made about operating for reserving a future program. The viewer moves the cursor into the left side area of the current time line in the EPG and selects one of the future programs with the remote controller. In FIG. 21, a program named "POPULAR SONGS COUNT DOWN 40" is selected. Next, the viewer directs the EPG displaying device to display a list of names and remaining capacity of storage devices that are incorporated and externally connected with the EPG displaying device. In reference with the list, the viewer directs the EPG displaying device to be going to record a future program in a storage device of the list and reservation of recording a future program is finished. FIG. 22 shows an EPG screen when the viewer is selecting one of the storage devices managed by the EPG displaying device. FIG. 23 shows an EPG screen when the viewer finishes reserving a program named "POPULAR SONGS COUNT DOWN 40". The viewer can cancel reservation by selecting the reserved program again by the cursor.

In case of recording a current program that the viewer is watching, the EPG displaying device starts to record the current program in the contents recorder 812 when a direction to record the current program is received by the remote control Input 809. And then, the EPG displaying device displays an EPG screen as shown in FIG. 22. In reference with the EPG screen, the viewer selects one of the listed storage devices and the EPG displaying device starts to record the current program in the selected storage device.

In case of playing a recorded program selected in EPG, the viewer selects a recorded program to move the cursor onto the program in EPG and directs the EPG displaying device to play the program, (9) Time-shift Recording 1

Time-shift recording means recording content signals of at least one channel without viewer's direction and deleting the content signals beyond predetermined number of programs or time length if the viewer does not direct to record the content signals. The number of channels, the predetermined number of programs, and the predetermined time length available for recording content signals depend on capacity, and reading/writing ability of storage devices managed by the EPG displaying device, and the number of tuner modules included in the EPG displaying device.

In case of that predetermined kinds of programs, which include a recorded program, a reserved program, a selected program and a time-shift recorded program, are distinct from the other programs by difference in background colors, each of the predetermined kinds of programs may be painted in different color.

(10) Time-shift Recording 2

Next, another type of time-shift recording will be described below. By this type of time-shift recording, a program is temporarily recorded and played back later Before time-shift recording, the EPG displaying device is set a channel number and time length or number of programs. When the viewer does not set these values, these values are set to default values. The number of channels to be time-shift recorded must be set as if recording reserved programs are not disturbed. Execution of time-shift recording depends on the viewer's direction, Recording a program starts when time-shift recording is set.

The program information receiver 101 receives program information of a channel set to execute time-shift recording The temporary recording controller 104 manages the received program information.

Content signals such as audio and video signals are received by the tuner 102 and recorded in the temporary storage device 103.

According to the information managed by the temporary recording controller 104, it is decided whether programs recorded in the temporary storage device 103 are deleted or not. The programs are deleted with number of programs or time length as a unit. If the viewer directs to record a program before the program is deleted from the temporary storage device 103, the program is moved to the storage device 105 not to be deleted automatically.

The contents recorded by time-shift recording are available for either normal or trick playing. While normal/trick playing of contents is being executed, deleting the contents is inhibited.

The above-mentioned embodiment can not only execute time-shift recording, but also automatically record the program that is predetermined by the viewer in the temporary storage device 103 such as HDD. The embodiment can record a current program in parallel with executing trick playing of the current program. The video recorder of the invention comprises a random access storage device like HDD as a temporary storage device, so that the video recorder can record content signals without delay. When the video recorder is connected with Internet, the video recorder may store video signals via World Wide Web in the temporary storage device. If the temporary storage device has endless recording time, the video recorder is always storing content signals. The video recorder may constantly record latest program of specific type of programs such as news program and weather forecast in order to provide the viewer with latest program.

As mentioned above, a video recorder of this invention comprises a built-in storage device to temporarily record contents and unifies interface of a plurality of storage devices by recording in the storage devices via the built-in storage device, so that the viewer of the video recorder is free to select starting time and a storage device to record contents.

Furthermore, a temporary recording controller manages to record constant amount of the latest contents so that the video recorder can realize time free view of contents.

Furthermore, the viewer operates the video recorder through EPG that displays past, current and future programs as one table so that the viewer can play back recorded programs and reserve to record future programs by easy operation. The EPG is painted in several colors so that the viewer can recognize status of each program.

While this invention has thus far been described in conjunction with a few embodiments thereof, it will be readily possible for those skilled in the art to put the this invention into various other manners.

What is claimed is:

1. A video recorder for recording content signals including audio and video signals, comprising:

means for receiving program information signals designating a program identifier, starting and ending time of a program;

a first storage device;

first recording means for continuously recording the content signals of at least one channel in the first storage device;

means for deleting the content signals of the oldest program recorded in the first storage device in reference with the program information signals;

a second storage device;

second recording means for recording content signals in the second storage device according to a direction given from outside of the video recorder in order to record contents;

direct recording means for recording current content signals which are currently received by the video recorder in the second storage device without recording in the first device;

indirect recording means for copying content signals that have been recorded in the first storage device into the second storage device; and means for automatically merging content signals recorded by both the direct recording means and the indirect recording means into one file.

2. A video recorder as claimed in claim 1, wherein the first storage device belongs to a random access storage device.

3. A video recorder as claimed in claim 2, wherein the random access storage is comprises at least one hard disk drive.

* * * * *